(12) United States Patent
Di Giovanni

(10) Patent No.: US 11,546,383 B2
(45) Date of Patent: Jan. 3, 2023

(54) IMS COMMUNICATION METHOD AND SYSTEM USING PRECONDITIONS

(71) Applicant: SUMMIT-TECH, Montréal (CA)

(72) Inventor: Alido Di Giovanni, Montreal (CA)

(*) Notice: Subject to any disclaimer, the term of this patent is extended or adjusted under 35 U.S.C. 154(b) by 0 days.

(21) Appl. No.: 15/120,422

(22) PCT Filed: Feb. 24, 2015

(86) PCT No.: PCT/CA2015/000111
§ 371 (c)(1),
(2) Date: Aug. 19, 2016

(87) PCT Pub. No.: WO2015/123761
PCT Pub. Date: Aug. 27, 2015

(65) Prior Publication Data
US 2017/0078335 A1 Mar. 16, 2017

Related U.S. Application Data

(60) Provisional application No. 61/944,004, filed on Feb. 24, 2014.

(51) Int. Cl.
*H04L 65/1016* (2022.01)
*H04L 65/1053* (2022.01)
*H04L 65/1069* (2022.01)
*H04L 9/40* (2022.01)
*H04L 65/1096* (2022.01)
*H04M 3/42* (2006.01)
*H04M 7/00* (2006.01)

(52) U.S. Cl.
CPC ......... *H04L 65/1016* (2013.01); *H04L 63/10* (2013.01); *H04L 65/1053* (2013.01); *H04L 65/1069* (2013.01); *H04L 65/1096* (2013.01); *H04M 3/42314* (2013.01); *H04M 7/006* (2013.01)

(58) Field of Classification Search
None
See application file for complete search history.

(56) References Cited

U.S. PATENT DOCUMENTS

| | | | | |
|---|---|---|---|---|
| 7,734,028 B2* | 6/2010 | Dhara | ................. | H04L 65/1101 379/142.04 |
| 7,783,016 B2* | 8/2010 | Wolfman | .............. | H04M 1/575 379/207.15 |
| 8,923,504 B1* | 12/2014 | Bracco | ................. | H04M 3/4211 379/266.01 |
| 8,958,346 B2* | 2/2015 | Silver | ................. | H04L 65/1076 379/142.01 |
| 2001/0040887 A1* | 11/2001 | Shtivelman | ......... | H04M 3/5237 370/352 |
| 2006/0193453 A1* | 8/2006 | Price | ..................... | H04M 1/665 379/211.01 |

(Continued)

*Primary Examiner* — Younes Naji
(74) *Attorney, Agent, or Firm* — Praxis

(57) ABSTRACT

A communication method between a communication initiating device and a communication response system using preconditions, comprising the steps of initiating a call from the communication initiating device to the communication response system, before answering the call, requesting information in accordance with the preconditions and performing one or more predefined action in response to the obtaining of the requested information.

14 Claims, 2 Drawing Sheets

(56) References Cited

U.S. PATENT DOCUMENTS

| | | | |
|---|---|---|---|
| 2008/0075240 A1* | 3/2008 | Ramanathan | H04M 7/0042 379/88.12 |
| 2010/0291909 A1* | 11/2010 | Nagaraja | H04M 1/575 455/415 |
| 2011/0103570 A1* | 5/2011 | Gao | H04M 3/42068 379/207.16 |
| 2011/0255677 A1* | 10/2011 | Kasad | H04M 3/42357 379/142.1 |
| 2012/0294434 A1* | 11/2012 | Fan | H04W 4/02 379/142.1 |
| 2013/0143517 A1* | 6/2013 | Mitchell, Jr. | H04W 4/90 455/404.1 |
| 2014/0229968 A1* | 8/2014 | Francisco | H04N 21/25875 725/16 |

* cited by examiner

US 11,546,383 B2

IMS COMMUNICATION METHOD AND SYSTEM USING PRECONDITIONS

CROSS-REFERENCE TO RELATED APPLICATIONS

This application claims the benefits of U.S. provisional patent application No. 61/944,004 filed on Feb. 24, 2014, which is herein incorporated by reference.

TECHNICAL FIELD

The present disclosure relates to an IP Multimedia Core Network Subsystem (IMS) communication method and system using preconditions.

BACKGROUND

IP Multimedia Core Network Subsystem (IMS) is an architectural framework for delivering IP multimedia services originally designed by the wireless standards body 3rd Generation Partnership Project (3GPP), as a part of the vision for evolving mobile networks beyond Global System for Mobile Communications (GSM).

However, there is a need for an (IMS) communication method and system for customizing and/or handling received calls more efficiently.

SUMMARY

There is provided a communication method between a communication initiating device and a communication response system using preconditions, comprising the steps of:
  a. initiating a call from the communication initiating device to the communication response system;
  b. before answering the call, requesting information in accordance with the preconditions; and
  c. performing one or more predefined action in response to the obtaining of the requested information.

There is also provided communication method as above, wherein the communication initiating device is an IP Multimedia Core Network Subsystem (IMS) device and the communication response system is an IP Private Branch Exchange (IP-PBX) system.

There is further provided a communication method as above, wherein step b. of requesting information is performed through a push back procedure using a pop-up message.

There is further still provided a communication method as above, wherein the communication initiating device can be set to provide the requested information to the communication response system automatically, for selected communication response systems, for accredited communication response systems or for selected types of requested information.

There is also provided a communication method as above, wherein the requested information is assigned a sensitivity level and wherein the one or more predefined action is selected based on the sensitivity level of the requested information.

There is further provided a communication method as above, wherein the one or more predefined action is to place the call in a calling queue of a service center.

There is further still provided a communication method as above, further comprising the step of:
  d. retrieving further information based on the obtained requested information.

There is also provided a communication system between a communication initiating device and a communication response system using preconditions, the system implementing the above methods.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiments of the present disclosure provide an Internet Protocol (IP) Multimedia Subsystem or IP Multimedia Core Network Subsystem (IMS) communication method and system using preconditions. IMS is an architectural framework for delivering IP multimedia services originally designed by the wireless standards body 3rd Generation Partnership Project (3GPP), as a part of the vision for evolving mobile networks beyond Global System for Mobile Communications (GSM).

Figure 1:
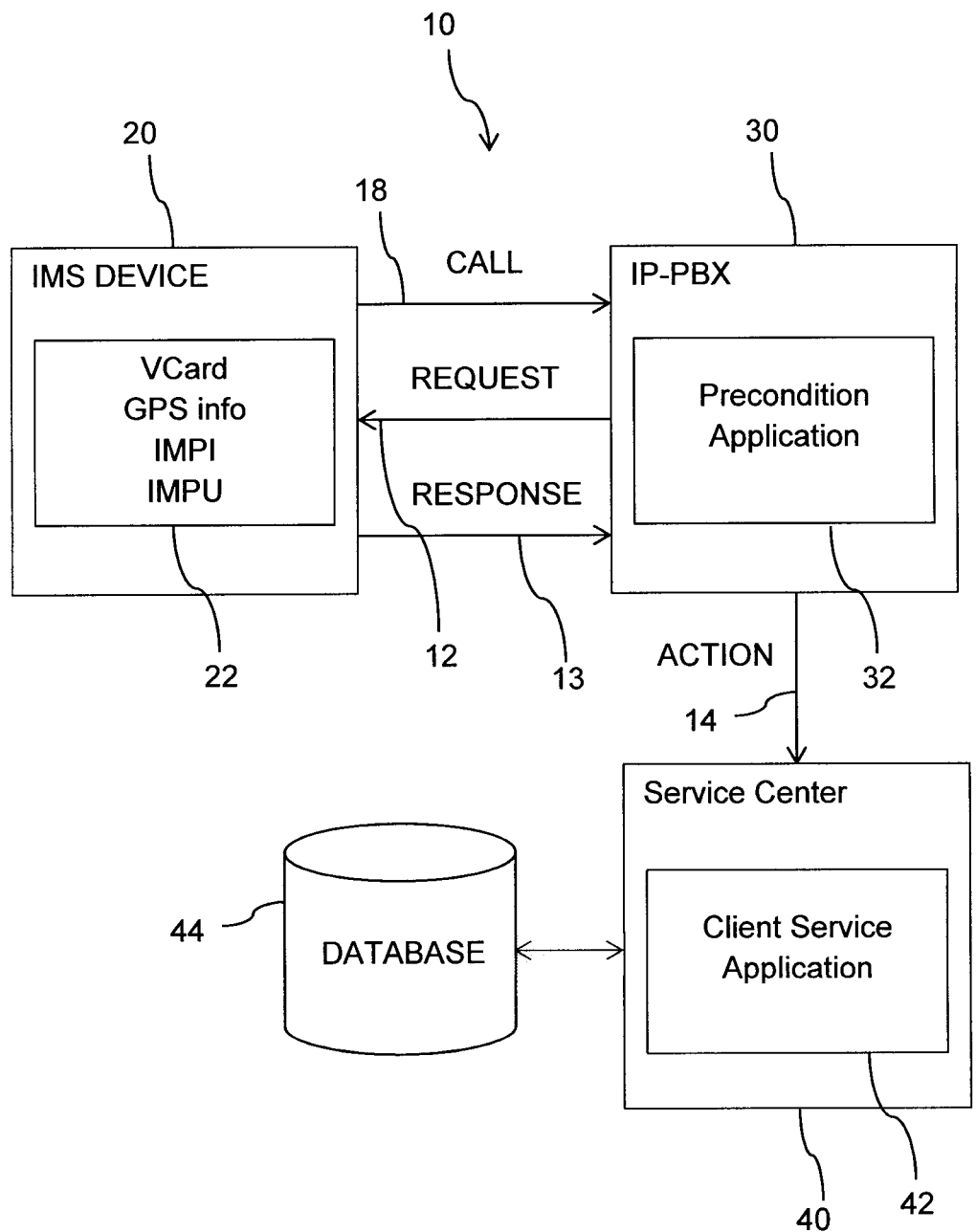
FIG. 1 is a schematic representation of an example of an IP Multimedia Core Network Subsystem (IMS) communication system using preconditions in accordance with an illustrative embodiment of the present disclosure.

Referring to FIG. 1, there is shown an example of an IMS communication using preconditions 10 in accordance with an illustrative embodiment of the present disclosure. In the illustrated example, a user uses an IMS device 20, for example a smart phone using GSM as described in Permanent Reference Document (PRD) IR.92 or even IR.58, to communicate with a recipient having an IP Private Branch Exchange (IP-PBX) system 30, for example a service provider, a multimedia provider, a professional's office or other types of businesses providing client services.

The IMS device 20 contains various types of information such as VCard, Global Positioning System (GPS) info, IP Multimedia Private Identity (IMPI), IP Multimedia Public Identity (IMPU), or other information. The IMPI is a unique permanently allocated global identity assigned by the home network operator, and is used, for example, for Registration, Authorization, Administration, and Accounting purposes. The IMPU is used by the user to request communication with other users (e.g. this might be included on a business card). There can be multiple IMPU per IMPI. The IMPU can also be shared with another IMS device 20, so that both can be reached with the same identity.

The IP-PBX system 30 can provide, for example, audio, video, voice over internet protocol (VoIP) and instant messaging communication through the TCP/IP protocol stack for its internal network and interconnects its internal network with the public switched telephone network (PSTN) for telephony communication.

Figure 2:
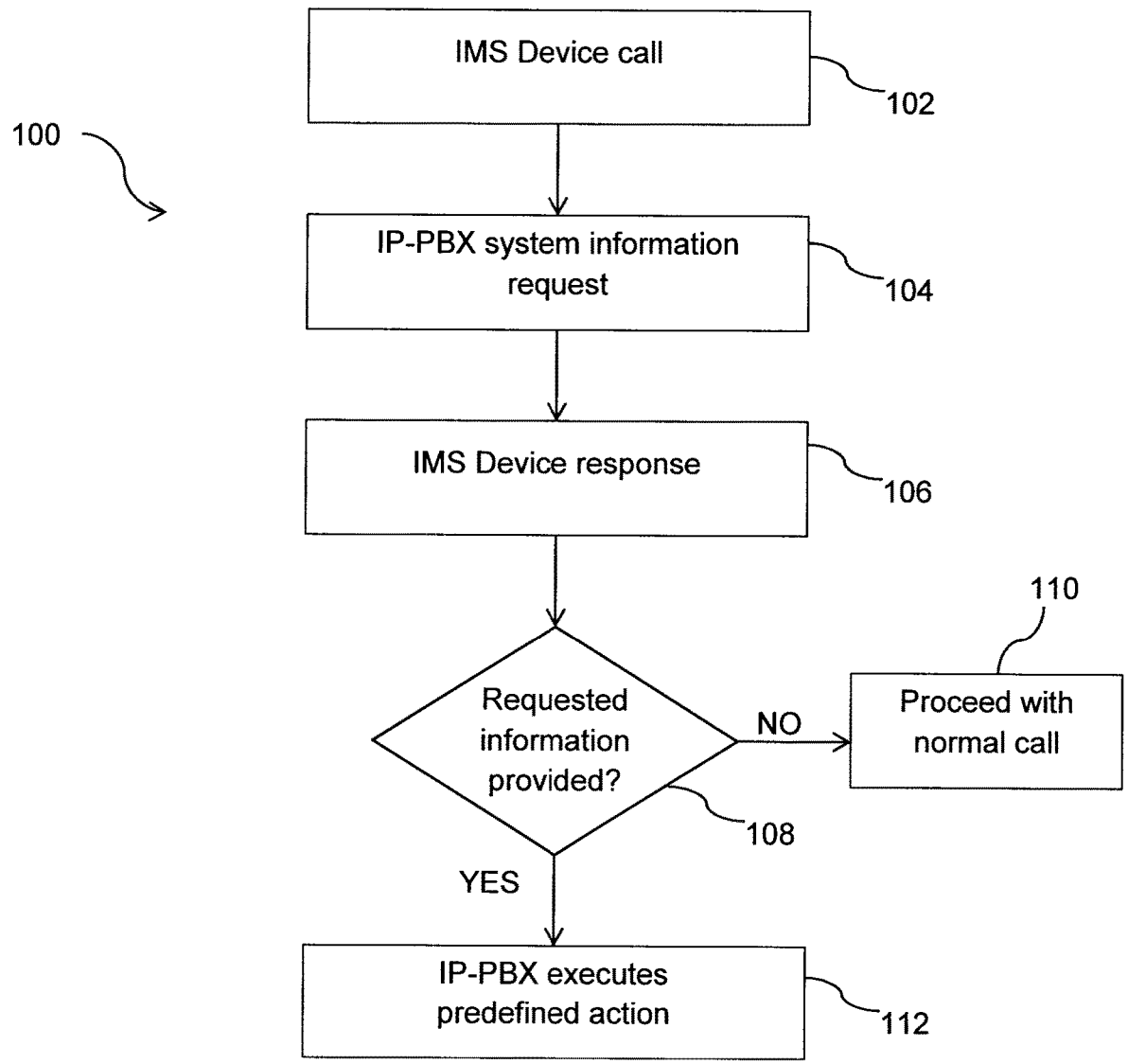
FIG. 2 is a flow diagram of the IMS communication process in accordance with an illustrative embodiment of the present disclosure.

Referring now to FIG. 2, there is shown a flow diagram of an illustrative example of the IMS process 100 illustrated in FIG. 1. Steps of the process 100 are indicated by blocks 102 to 112.

The process 100 starts at block 102 where a user initiates a call 11, using the IMS device 20, to the IP-PBX system 30.

At block 104, the IP-PBX system 30 requests information from the IMS device 20 through a push back procedure 12 using, for example, a pop-up message, in accordance with its preconditions application 32. It is to be understood that preconditions such as determining if the IMS device 20 has High Definition (HD) video capability, or other such preconditions, may be handled automatically and seamlessly.

Then, at block 106, the IMS device 20 responds 13 by accepting or refusing to provide the information requested by the IP-PBX system 30. The accepting or refusing to provide the information is effectuated by the user of the IMS device 20. However, in an alternative embodiment, the IMS device 20 may be set to automatically provide information to approved IP-PBX systems 30, either explicitly identified or through some accreditation. In a further alternative embodiment, the IMS device 20 may be set to automatically provide certain predefined types of information while other types of information require the input or acceptance of the user. It is to be understood that requested information may be assigned different levels of sensitivity.

At block 108, the IP-PBX system 30 verifies if the user has provided the requested information (either by the user accepting to provide the requested information or the IMS device 20 being set to automatically provide the information). If not, the process 100 proceeds to block 110 where the call 11 proceeds as per a normal call, if so, it proceeds to block 112.

Finally, at block 112, using the requested information provided by the IMS device 20, the preconditions application 32 instructs the IP-PBX system 30 to execute one or more predefined action 14. In an alternative embodiment, there may be a selection of predefined actions 14 by the preconditions application 32 depending on the level of sensitivity of the provided information 13. The predefined action 14 may be, for example but not limited to, placing the call in a special calling queue (for example a queue with a quicker response time) of a service center 40, which makes available the provided information 13 to a service representative through a client service application 42, which may pull further information associated with the provided information 13 from a database 44. The predefined action 14 may also be, for example, the sending of coupons or other documents/offers to the user, providing audio, video, voice over internet protocol (VoIP) or instant messaging communications.

It is to be understood that process 100 may be applied to communications between other types of initiating devices and response systems. It is to be further understood that the initiating devices and response systems include processors and associated memories for executing and storing the IMS communication process, precondition application and other various related information.

Although the present disclosure has been described with a certain degree of particularity and by way of an illustrative embodiment and examples thereof, it is to be understood that the present disclosure is not limited to the features of the embodiments described and illustrated herein, but includes all variations and modifications within the scope and spirit of the disclosure as hereinafter claimed.

What is claimed is:

1. A communication method between a communication initiating device and a communication response system using preconditions, comprising the steps of:
    a) a user of the communication initiating device initiating a call from the communication initiating device to the communication response system;
    b) before answering the call, the communication response system requesting from the communication initiating device information contained in the communication initiating device in accordance with the preconditions, the requested information including an IP Multimedia Private Identity (IMPI) and an IP Multimedia Public Identity (IMPU);
    c) for a first group of types of requested information, the communication initiating device requesting permission from the user to provide the requested information to the communication response system and upon receiving permission from the user, providing the requested information to the communication response system;
    d) for a second group of types of requested information, the communication initiating device automatically providing the requested information to the communication response system;
    e) the communication response system verifying if the communication initiating device has provided the requested information; and
    f) upon detection of reception of the requested information, the communication response system performing one or more predefined action in accordance with the preconditions using the requested information provided by the communication initiating device.

2. The communication method of claim 1, wherein the communication initiating device is an IP Multimedia Core Network Subsystem (IMS) device and the communication response system is an IP Private Branch Exchange (IP-PBX) system.

3. The communication method of claim 1, wherein the requested information further includes Global Positioning System (GPS) info.

4. The communication method of claim 1, wherein step b) of requesting information is performed through a push back procedure.

5. The communication method of claim 4, wherein the push back procedure uses a pop-up message.

6. The communication method of claim 1, wherein the communication initiating device automatically provides the requested information to the communication response system for accredited communication response systems.

7. The communication method of claim 1, wherein the requested information is assigned a sensitivity level.

8. The communication method of claim 7, wherein the one or more predefined action is selected based on the sensitivity level of the requested information.

9. The communication method of claim 1, wherein the one or more predefined action is selected from a group consisting of sending of coupons, sending of documents, sending of offers, providing audio, providing video, providing voice over internet protocol (VoIP) and providing instant messaging communications.

10. The communication method of claim 1, wherein the one or more predefined action is to place the call in a calling queue of a service center.

11. The communication method of claim 10, step f) further includes:
    retrieving from a database further information based on the requested information.

12. The communication method of claim 1, wherein the communication initiating device automatically provides the requested information to the communication response system for specific communication response systems.

13. The communication method of claim 1, wherein the requested information further includes a virtual business card (VCard).

14. A communication method between a communication initiating device and a communication response system using preconditions, comprising the steps of:
- a) a user of the communication initiating device initiating a call from the communication initiating device to the communication response system;
- b) before answering the call, the communication response system requesting from the communication initiating device information contained in the communication initiating device in accordance with the preconditions, the requested information including a virtual business card (VCard), an IP Multimedia Private Identity (IMPI) and an IP Multimedia Public Identity (IMPU);
- c) for a first group of types of requested information, the communication initiating device requesting permission from the user to provide the requested information to the communication response system and upon receiving permission from the user, providing the requested information to the communication response system;
- d) for a second group of types of requested information, the communication initiating device automatically providing the requested information to the communication response system;
- e) the communication response system verifying if the communication initiating device has provided the requested information; and
- f) upon detection of reception of the requested information, the communication response system performing one or more predefined action in accordance with the preconditions using the requested information provided by the communication initiating device.

* * * * *